(12) United States Patent
Salkintzis (10) Patent No.: US 9,560,108 B2
(45) Date of Patent: Jan. 31, 2017

(54) PROVIDING A MOBILE ACCESS POINT (75) Inventor: Apostolis K. Salkintzis, Athens (GR)

(73) Assignee: Google Technology Holdings LLC, Mountain View, CA (US)

(*) Notice: Subject to any disclaimer, the term of this patent is extended or adjusted under 35 U.S.C. 154(b) by 924 days.

(21) Appl. No.: 13/613,673

(22) Filed: Sep. 13, 2012

(65) Prior Publication Data
US 2014/0075011 A1   Mar. 13, 2014

(51) Int. Cl.
*H04L 12/28* (2006.01)
*H04W 48/20* (2009.01)
*H04W 76/02* (2009.01)
*H04L 29/08* (2006.01)

(52) U.S. Cl.
CPC ........... *H04L 67/00* (2013.01); *H04L 12/2856* (2013.01); *H04W 48/20* (2013.01); *H04W 76/028* (2013.01)

(58) Field of Classification Search
CPC ... H04W 88/08; H04W 48/20; H04W 52/0206
See application file for complete search history.

(56) References Cited

U.S. PATENT DOCUMENTS

| 4,881,123 | A  | 11/1989 | Chapple |
| 5,584,052 | A  | 12/1996 | Gulau et al. |
| 5,649,307 | A  | 7/1997  | Patino |
| 6,459,911 | B1 | 10/2002 | Hijii |
| 6,470,197 | B1 | 10/2002 | Tuoriniemi et al. |
| 6,594,632 | B1 | 7/2003  | White |
| 6,874,127 | B2 | 3/2005  | Newell et al. |
| 6,970,752 | B1 | 11/2005 | Lim et al. |
| 7,110,799 | B1 | 9/2006  | Willins et al. |

(Continued)

FOREIGN PATENT DOCUMENTS

| EP | 1991018 A1 | 11/2008 |
| GB | 2470243 A  | 11/2010 |

(Continued)

OTHER PUBLICATIONS

Patent Cooperation Treaty, International Search Report and Written Opinion of the International Searching Authority for International Application No. PCT/US2013/055237, Dec. 9, 2013, 9 pages.

(Continued)

*Primary Examiner* — Joe Chacko
(74) *Attorney, Agent, or Firm* — Wolfe-SBMC (57) ABSTRACT

Disclosed are methods and apparatus for providing an access point for connection to the Internet. The methods may be performed using one or more user devices (e.g. smartphones or other mobile communications devices) which may be part of a residential Local Area Network or "home" network. A user device may detect that a connection to the Internet via a first access point is unavailable. This connection may be via a residential gateway. In response to the detection that Internet connectivity via the first access point is unavailable, a user device (e.g. the same or different user device) may activate a second access point (e.g. a wireless or mobile access point) to the Internet for use by other user devices. Other user devices may then connect to the Internet using this second access point. The second access point may be de-activated if Internet connectivity via the first access point is re-established.

20 Claims, 3 Drawing Sheets

(56) References Cited

U.S. PATENT DOCUMENTS

| | | | |
|---|---|---|---|
| 7,177,952 B1 | 2/2007 | Wurch et al. | |
| 7,224,992 B2 | 5/2007 | Patino et al. | |
| 7,254,420 B1 | 8/2007 | Klein | |
| 7,382,771 B2* | 6/2008 | Leblanc et al. | 370/352 |
| 7,584,290 B2 | 9/2009 | Ruskin et al. | |
| 7,620,432 B2 | 11/2009 | Willins et al. | |
| 7,643,642 B2 | 1/2010 | Patino et al. | |
| 7,707,292 B2 | 4/2010 | Henderson et al. | |
| 7,813,696 B2 | 10/2010 | Kim | |
| 7,983,722 B2 | 7/2011 | Lowles et al. | |
| 8,073,137 B2 | 12/2011 | Weinans et al. | |
| 8,081,612 B2* | 12/2011 | Want et al. | 370/338 |
| 8,095,081 B2 | 1/2012 | Vance | |
| 8,280,038 B2 | 10/2012 | Johnson et al. | |
| 8,621,071 B1* | 12/2013 | Scofield et al. | 709/224 |
| 8,634,534 B1 | 1/2014 | Brandt et al. | |
| 8,665,847 B2* | 3/2014 | Holostov et al. | 370/338 |
| 8,909,173 B2 | 12/2014 | Harmke | |
| 9,438,642 B2 | 9/2016 | Alberth et al. | |
| 2003/0046401 A1 | 3/2003 | Abbott et al. | |
| 2003/0083061 A1* | 5/2003 | Robinson et al. | 455/425 |
| 2004/0153708 A1 | 8/2004 | Joshi et al. | |
| 2005/0251823 A1 | 11/2005 | Saarikivi | |
| 2006/0153198 A1* | 7/2006 | Chadha | H04L 67/14 |
| | | | 370/395.2 |
| 2007/0064684 A1 | 3/2007 | Kottilingal | |
| 2007/0113081 A1 | 5/2007 | Camp | |
| 2007/0167174 A1* | 7/2007 | Halcrow et al. | 455/456.2 |
| 2007/0266135 A1 | 11/2007 | Friedland et al. | |
| 2008/0019522 A1 | 1/2008 | Proctor | |
| 2008/0108301 A1 | 5/2008 | Dorenbosch | |
| 2008/0204543 A1 | 8/2008 | Ferren et al. | |
| 2008/0319827 A1 | 12/2008 | Yee et al. | |
| 2009/0024760 A1 | 1/2009 | Saha et al. | |
| 2009/0094283 A1 | 4/2009 | Baudisch et al. | |
| 2009/0132712 A1 | 5/2009 | P et al. | |
| 2009/0138609 A1 | 5/2009 | Anderson et al. | |
| 2009/0288139 A1 | 11/2009 | Huber et al. | |
| 2009/0307511 A1 | 12/2009 | Fiennes et al. | |
| 2010/0041447 A1 | 2/2010 | Graylin | |
| 2010/0054493 A1 | 3/2010 | Lin et al. | |
| 2010/0161813 A1 | 6/2010 | Avasarala | |
| 2010/0169446 A1 | 7/2010 | Linden et al. | |
| 2010/0290444 A1* | 11/2010 | Souissi et al. | 370/338 |
| 2010/0330997 A1* | 12/2010 | Lee | 455/436 |
| 2011/0149928 A1* | 6/2011 | Wu et al. | 370/338 |
| 2011/0222516 A1* | 9/2011 | Kurose et al. | 370/338 |
| 2011/0263303 A1 | 10/2011 | Lowles et al. | |
| 2011/0286437 A1* | 11/2011 | Austin | H04W 4/02 |
| | | | 370/338 |
| 2012/0044354 A1* | 2/2012 | Cheng et al. | 348/159 |
| 2012/0057456 A1* | 3/2012 | Bogatin et al. | 370/230.1 |
| 2012/0083256 A1* | 4/2012 | Sperling et al. | 455/414.2 |
| 2012/0093009 A1* | 4/2012 | Wang et al. | 370/252 |
| 2012/0134309 A1* | 5/2012 | Sakai | 370/311 |
| 2012/0136942 A1 | 5/2012 | Amidon et al. | |
| 2012/0178370 A1 | 7/2012 | George | |
| 2012/0214549 A1 | 8/2012 | Philbin | |
| 2012/0257536 A1* | 10/2012 | Kholaif et al. | 370/254 |
| 2013/0094485 A1* | 4/2013 | Jiang et al. | 370/338 |
| 2013/0097657 A1* | 4/2013 | Cardamore et al. | 726/1 |
| 2013/0170432 A1* | 7/2013 | O'Brien et al. | 370/328 |
| 2013/0182693 A1* | 7/2013 | Sperling et al. | 370/338 |
| 2013/0195283 A1 | 8/2013 | Larson et al. | |
| 2013/0215740 A1* | 8/2013 | Tse et al. | 370/228 |
| 2013/0263048 A1 | 10/2013 | Shimizu | |
| 2013/0297704 A1 | 11/2013 | Alberth et al. | |
| 2014/0010135 A1* | 1/2014 | Navda et al. | 370/311 |
| 2014/0105003 A1* | 4/2014 | Austin et al. | 370/229 |
| 2015/0092954 A1 | 4/2015 | Coker et al. | |
| 2016/0359985 A1 | 12/2016 | Alberth et al. | |

FOREIGN PATENT DOCUMENTS

| | | |
|---|---|---|
| WO | WO-2006017330 | 2/2006 |
| WO | WO-2006060115 | 6/2006 |
| WO | 2007092623 A2 | 8/2007 |
| WO | WO 2007092623 A3 * | 9/2008 |
| WO | WO-2010053345 | 5/2010 |
| WO | 2010121205 A1 | 10/2010 |

OTHER PUBLICATIONS

International Bureau of WIPO, International Preliminary Report on Patentability in International Patent Application No. PCT/US2013/055237 (Mar. 26, 2015).

"Advisory Action", U.S. Appl. No. 13/461,234, Jan. 26, 2015, 3 pages.

"An-1432 The LM4935 Headset and Push-Button Detection Guide", Texas Instruments Incorporated—http://www.ti.com/lit/an/snaa024a.snaa024a.pdf, May 2013, 8 pages.

"Earbud with Push-to-Talk Microphone", Motorola, Inc., model 53727, iDEN 2.5 mm 4-pole mono PTT headset NNTNN5006BP, 10 pages.

"Final Improvement Proposal for PTT Support in HFP", Bluetooth SIG, Inc., revision V10r00 (PTTinHFP_FIPD), Jul. 20, 2010, 50 pages.

"Final Office Action", U.S. Appl. No. 13/461,234, Jul. 10, 2015, 23 pages.

"Final Office Action", U.S. Appl. No. 13/641,234, Nov. 4, 2014, 21 pages.

"International Preliminary Report on Patentability", Application No. PCT/US2013/038577, Nov. 13, 2014, 7 pages.

"International Search Report and Written Opinion", Application No. PCT/US2014/045755, Oct. 23, 2014, 11 pages.

"International Search Report and Written Opinion", Application No. PCT/US2013/038577, Sep. 17, 2013, 9 Pages.

"Motorola SJYN0505A Stereo Push to Talk Headset for Nextel", Motorola Inc., iDEN 5-pole 2.5 mm Stereo Headset SJYN05058A, 2 pages.

"MSF White Paper on Service Continuity (IUT)", MSF-TR-Services-003 Final, 2009, 21 pages.

"Non-Final Office Action", U.S. Appl. No. 13/461,234, Jan. 12, 2016, 27 pages.

"Non-Final Office Action", U.S. Appl. No. 13/461,234, Mar. 6, 2015, 28 pages.

"Non-Final Office Action", U.S. Appl. No. 13/461,234, Jul. 23, 2014, 23 pages.

"Non-Final Office Action", U.S. Appl. No. 14/068,309, Oct. 2, 2015, 14 pages.

Baldauf,"A Survey on Context-Aware Systems", Int J. Ad Hoc and Ubiquitous Computing, vol. 2, No. 4, 2007, pp. 263-277.

Boutabia,"SESSAMO: Session Mobility for Video Streaming Applications", International Journal of UBICOMP (IJU), vol. 2, No. 2, Apr. 2011.

De"MPEG-21 Session Mobility for Heterogeneous Devices", Euromedia '2004: 10th Annual Euromedia Conference. p. 61-67, 2004, 7 pages.

De"MPEG-21 Session Mobility on Mobile Devices", ICOMP '05 Proceedings of the 2005 International Conference on Internet Computing, Las Vegas, NV, Jun. 27, 2005, pp. 287-293.

Mate,"Movable-Multimedia: Session Mobility in Ubiquitous Computing Ecosystem", MUM '06 Proceedings of the 5th International Conference on Mobile and Ubiquitous Multimedia, ACM New York, NY, 2006, 5 pages.

Thakolsri,"Session Mobility: Service Continuity Across Terminals", Collaboration Projects, NTT DoCoMo Technical Journal, vol. 8, No. 4., Jan. 2007, pp. 59-62.

"Final Office Action", U.S. Appl. No. 14/068,309, Apr. 7, 2016, 11 pages.

"Notice of Allowance", U.S. Appl. No. 13/461,234, Apr. 29, 2016, 8 pages.

* cited by examiner

PROVIDING A MOBILE ACCESS POINT

FIELD OF THE INVENTION

The present invention relates to providing access points for connection to the Internet.

BACKGROUND OF THE INVENTION

Many user devices e.g. smartphones and other mobile communications devices, provide a "Mobile Hotspot" capability. The Mobile Hotspot capability enables a user device to function as a mobile access point to the Internet (or other network) which may be used by other user devices (e.g. other mobile communications devices) to connect to the Internet (or other network).

Typically, the Mobile Hotspot functionality of a user device has to be manually activated e.g. by a user of that user device.

DETAILED DESCRIPTION

Embodiments of the invention provide methods and apparatus for providing an access point for connection to the Internet. The methods may be performed using one or more user devices (e.g. smartphones or other mobile communications devices) which may be part of a residential Local Area Network or "home" network. A user device may detect that a connection to the Internet via a first access point is not available (an access point being a device that, in normal operation, allows wireless devices to connect to the Internet). This connection may be via a residential gateway. In response to the detection that Internet connectivity via the first access point is not available, a user device (e.g. the same or different user device) may activate a second access point (e.g. a wireless or mobile access point) to the Internet for use by other user devices. Other user devices may then connect to the Internet using this second access point. The second access point may be de-activated if Internet connectivity via the first access point is re-established.

The user device that activates the second access point may have a capability to act as both a wireless or mobile access point and a router for the other user devices (e.g. it may have a capability to act as a Mobile Hotspot). The second access point may be provided by the user device activating this capability.

If there are multiple user devices that may provide the second access point, it may be determined which user device is to provide the second access point based on capabilities of the user devices. These capabilities may, for example, be dependent upon battery levels of the user devices, available processing power of the user devices, user specified preferences, the level of the wireless signal strength at the user devices, the cost of wireless communication of the user devices (e.g. user devices may be subscribed to different data plans with different charging characteristics), etc.

Further embodiments of the invention provide methods for connecting a user device to the Internet and user devices configured to connect to the Internet using those methods. The methods comprise, in response to a detection that Internet connectivity via the first access point is not available, a user device ascertaining that a connection to the Internet via the first access point is not available and that a connection to the Internet via a second access point is available. The second access point (e.g. a wireless or mobile access point) may be provided by a different user device and may have been activated by that different user device in response to the detection that a connection to the Internet via the first access point is not available. The user device may then connect itself to the Internet via the second access point.

In the following description, like reference numerals refer to like elements.

The following description is based on embodiments of the invention and should not be taken as limiting the invention with regard to alternative embodiments that are not explicitly described herein.

Apparatus for implementing any of the below described arrangements, and performing any of the below described method steps, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the below described process flowcharts may be omitted or such process steps may be performed in differing order to that presented below and shown in those process flowcharts. Furthermore, although all the process steps have, for convenience and ease of understanding, been depicted as discrete temporally-sequential steps, nevertheless some of the process steps may in fact be performed simultaneously or at least overlapping to some extent temporally.

Figure 1:
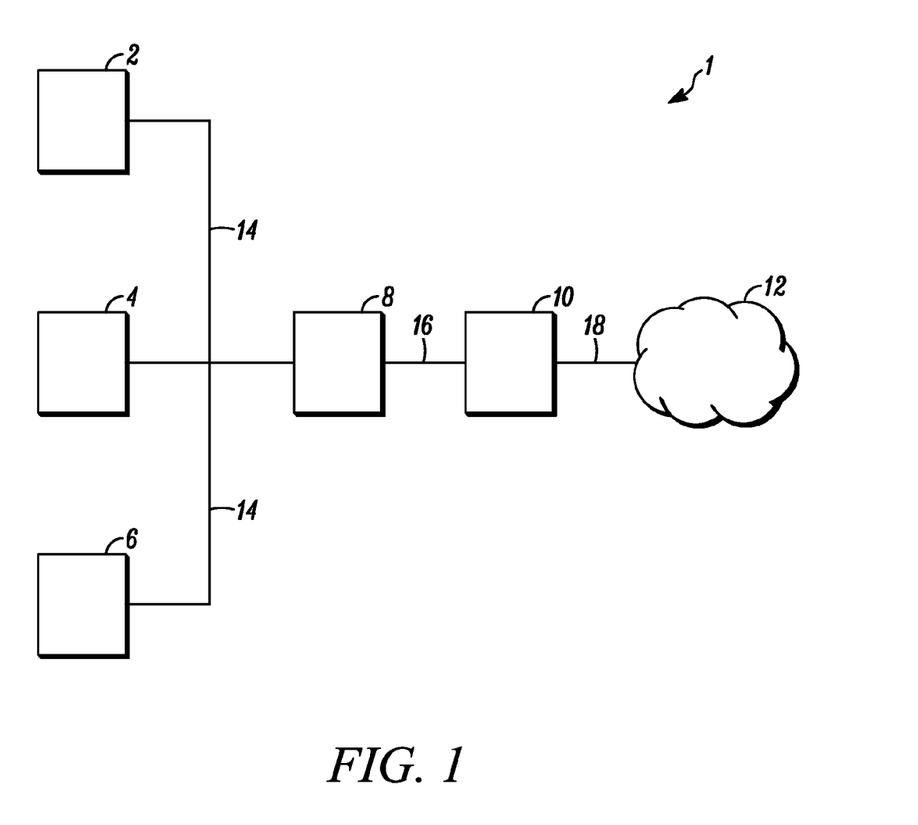
FIG. 1 is a schematic illustration (not to scale) showing an example network.

Referring now to the Figures, FIG. 1 is a schematic illustration (not to scale) showing an example network 1 that will be used to describe embodiments of the present invention.

This example network 1 comprises a first user device 2, a second user device 4, a third user device 6, an access point 8, a residential gateway 10 and the Internet 12. In other embodiments, the present invention may be implemented in a different network that may comprise a different number of user devices. Also, the present invention may be implemented in a different network that may comprise one or more appropriate different types of devices instead of or in addition to any or all of those devices in the network 1 shown in FIG. 1.

In the example network 1, the user devices 2, 4, 6, the access point 8, and the residential gateway 10 may be part of a residential Local Area Network (LAN) of a user of the user devices. This residential LAN may be referred to as a "home network".

The terminology "user device" is used herein to refer to a personal or mobile computing device. Thus, each of the user devices 2, 4, 6 may be, for example, a smartphone, a wireless phone, a desktop personal user device, a laptop user device, a tablet user device, a mobile station, an entertainment appliance, a netbook, a game console, etc.

Each of the user devices 2, 4, 6 is connected to each of the other user devices 2, 4, 6, and to the access point 8 via a first communication link 14. The first communication link 14 is a Wi-Fi™ communications link. In other embodiments, the first communication link 14 may be a different type of communication link, e.g. an Ethernet communications link.

The access point 8 is a wireless access point or a wireless router. In addition to being connected, via the first communication link 14, to each of the user devices 2, 4, 6, the access point 8 is connected (via a second communications link 16 which may, for example, be a wired or wireless communications link) to the residential gateway 10. In other embodiments, the second communication link 16 may be a different type of communication link.

The residential gateway 10 is connected to the Internet 12 via a third communications link 18. The third communications link may, for example, be a Wide Area Network (WAN) communications link such as ADSL/ATM, PPP, Frame Relay, Cable, Metro Ethernet, etc. This WAN communications link can be realized with any type of applicable technology including wired, wireless and satellite communication technologies. The residential gateway 10 is a home networking device that is configured to act as a gateway to connect the user devices 2, 4, 6 to the Internet 12. In other embodiments, the residential gateway 10 may act as a gateway to connect the user devices 2, 4, 6 to a different WAN other than Internet 12.

In the network 1, the access point 8 functions as a wireless access point or router (for the user devices 2, 4, 6) that provides access to the residential gateway 10 and subsequently to the Internet 12. The access point 8 is hereinafter referred to as the "primary access point".

In other words, in the network 1, connectivity to the Internet 12 is provided to each of the user devices 2, 4, 6 via the primary access point (which is provided by the access point 8 which is connected to the Internet via the residential gateway 10).

Each of the user devices 2, 4, 6 has a capability to act as a wireless or mobile access point, and a router, for devices connected to it (e.g. the other user devices). In this embodiment, each of the user devices 2, 4, 6 has a Mobile Hotspot capability (as the user devices 2, 4, 6 are connected together via a Wi-Fi™ communications link, i.e. the first communications link). In other words, each of the user devices 2, 4, 6 is able to function as a mobile access point (for each of the other user devices 2, 4, 6) to the Internet 12. In other words, each of the user devices 2, 4, 6 is able to provide Internet connectivity for each of the other user devices 2, 4, 6.

Figure 2:
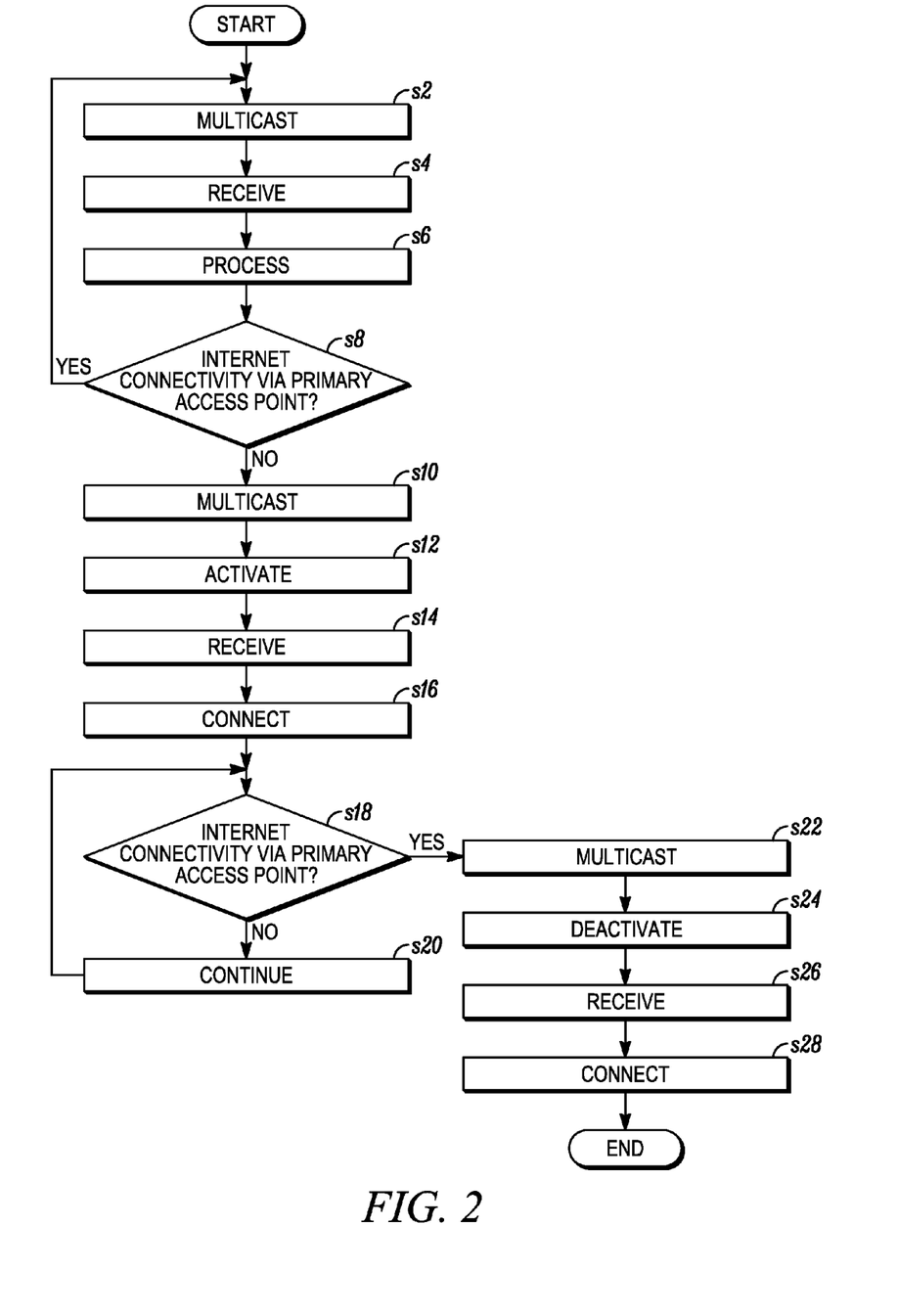
FIG. 2 is a process flow chart showing certain steps of an embodiment of a process performed by the entities in the example network.

FIG. 2 is a process flow chart showing certain steps of an embodiment of a process that may be performed by the entities in the example network 1.

At step s2, via the first communication link 14, each of the user devices multicasts a "capability" message that is received by each of the other user devices 2, 4, 6, which are configured to receive multicast messages at the multicast address where the "capability" message is sent. A capability message provided (i.e. multicast or sent) by a user device may be indicative of that user device's ability, readiness, and/or willingness to act as a Mobile Hotspot provider for the other user devices. In other words, a capability message provided by a user device may be indicative of that user device's "capability level", which may be a level that indicates that user device's relative ability, readiness, and/or willingness to act as a Mobile Hotspot provider for the other user devices. A capability message provided by a user device may, for example, indicate a battery status for that user device, available processing power that may be provided by that user device, one or more user defined preferences, the level of the wireless signal strength at the user device, the cost of wireless communication of the user device (e.g. user devices may be subscribed to different data plans with different charging characteristics), etc.

The user devices 2, 4, 6 may multicast a capability message to a designated (i.e. pre-configured) multicast address periodically, for example, every five minutes.

Thus, at step s2, each of the user devices 2, 4, 6, in effect, advertises to each of the other user devices 2, 4, 6 (which are configured to receive the multicast messages) its capability or willingness to act as a Mobile Hotspot (i.e. take on a role of Mobile Hotspot provider) for each of the other user devices 2, 4, 6. This capability advertisement may, for example, be accomplished using an extended version of Simple Service Discovery Protocol (SSDP) that is defined as part of the Universal Plug and Play (UPnP) specification.

In other embodiments, capability messages may be shared between the user devices 2, 4, 6 in a different appropriate way, e.g. they could be broadcast or shared via alternative means such as email or via Bluetooth communications.

At step s4, each of the user devices 2, 4, 6 receives, from each of the other user devices, the capability messages multicast by those other user devices 2, 4, 6.

At step s6, each of the user devices 2, 4, 6 processes the capability messages it has received from each of the other user devices 2, 4, 6.

This processing by each of the user devices 2, 4, 6 is performed such that each of the user devices 2, 4, 6 determines which user device 2, 4, 6 is the "best" device to act as a Mobile Hotspot (i.e. provide a mobile access point to the Internet 12) for each of the other user devices 2, 4, 6. For example, each of the user devices 2, 4, 6 may determined that the first user device 2 is the best device to act as a Mobile Hotspot for the other user devices 4, 6. A user device 2, 4, 6, may be determined to be the best device to act as a Mobile Hotspot based on any appropriate criteria and/or using any appropriate function (e.g. any function of one or more of the capability messages). For example, a user device 2, 4, 6 may be determined to be the best device to act as a Mobile Hotspot if it has the highest battery level, the most available processing power, or fulfils one or more user defined preferences.

In an example implementation, the capabilities multicast by each user device 2, 4, 6 are expressed as numeric values that are fed into a "cost function" (CF), e.g.

$$CF = x1*(\text{battery level}) + x2*(\text{processing power}) + x3*(\text{RF signal strength}) + x4*(\text{user-defined preference}) + x5*(\text{communications cost})$$

where x1, x2, x3, x4 and x5 are predefined weight values.

In this example, all user devices 2, 4, 6 may calculate the cost function that corresponds to all user devices 2, 4, 6. The best user device to act as a Mobile Hotspot may be the user device 2, 4, 6 that is determined to have the highest cost function.

The user device 2, 4, 6 which (at step s6) it is determined is the best device to act as a Mobile Hotspot is hereinafter referred to as the "best device".

Each of the user devices 2, 4, 6 may process the capability messages it has received using the same algorithm (e.g. the "cost function" (CF) described above) that each of the other user devices 2, 4, 6 use to processes the capability messages they have received. This tends to provide that each of the user devices identify the same user device 2, 4, 6 as the best device for acting as a Mobile Hotspot.

At step s8, the best device determines whether or not connectivity to the Internet 12 via the primary access point (i.e. via the access point 8 and the residential gateway 10) is possible. For example, if at step s6 each of the user devices 2, 4, 6 determine that the first user device 2 is the best user device to act as a Mobile Hotspot, at step s8, the first user device 2 determines whether or not Internet access via the access point 8 and residential gateway 10 is possible. The determination of whether or not internet connectivity via the primary access point is possible may be performed using any appropriate process. For example, the best device may send a "ping" message, via the primary access point, to be received by a host on the Internet. If no response to the ping message is received by the best device, the best device may determine that connectivity to the Internet 12 via the primary access point is not possible. As another example, the best device may use the UPnP protocol to check if the WAN interface of the residential gateway 10 is in operable status or not (e.g. due to connectivity errors or component malfunction). In this case, the residential gateway 10 may support the UPnP protocol.

The best device may periodically determine whether or not connectivity to the Internet 12 via the primary access point is possible. For example, the best device may transmit (or attempt to transmit) a ping message to an Internet host every few minutes. Alternatively, when the UPnP protocol is used to determine the status of WLAN interface of the residential gateway 10, the best device may configure the residential gateway to notify the best device immediately after the status of WAN interface changes.

If, at step s8, it is determined that connectivity to the Internet 12 via the primary access point is possible, the process of FIG. 2 may return back to step s2.

However, if at step s8 it is determined that connectivity to the Internet 12 via the primary access point is not possible, the process of FIG. 2 may proceed to step s10.

At step s10, via the first communication link 14, the best device multicasts a "fall back activated" message to each of the other user devices 2, 4, 6. The "fall back activated" message may indicate that connectivity to the Internet 12 via the primary access point is not possible and/or that connectivity to the Internet 12 may be acquired via a mobile access point provided by the best device. In other words, the "fall back activated" message may indicate that an Internet connection may be acquired using the best device as a Mobile Hotspot.

At step s12, after multicasting the fallback activated message, the best device activates its Mobile Hotspot capability. In other embodiments, the Mobile Hotspot capability of the best device may be activated before or during transmission of the fallback activated message. By activating its mobile Hotspot capability, the best device may function as a mobile access point (for each of the other user devices 2, 4, 6) to the Internet 12. In other words, the best device may provide Internet connectivity for each of the other user devices 2, 4, 6. The access point to the Internet 12 provided by the best device (using its Mobile hotspot capability) is hereinafter referred to as the "secondary access point".

At step s14, each of the user devices 2, 4, 6 other than the best device receives, from the best device, the fallback activated message multicast by the best device at step s10.

At step s16, each of the user devices 2, 4, 6 connect (e.g. reconnect) to the Internet 12 via the secondary access point provided by the best device. The best device may connect to Internet 12 in any appropriate way, for example, over a 3G or 4G wireless network. Each of the other user devices 2, 4, 6 (i.e. other than the best device) may connect to the Internet using the secondary access point provided by the best device (i.e. using the best device as a Mobile Hotspot).

Figure 3:
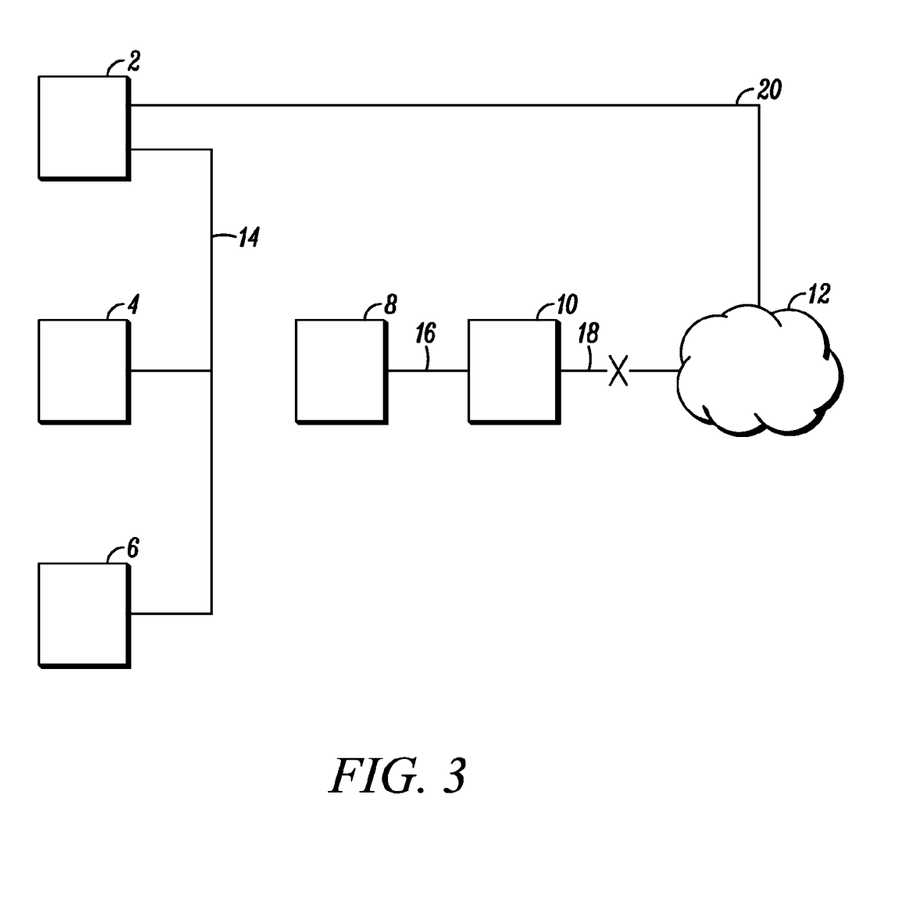
FIG. 3 is a schematic illustration (not to scale) showing how the entities of the network may be connected during the process of FIG. 2.

FIG. 3 is a schematic illustration (not to scale) showing an example of how the entities of the network 1 may be connected together at step s16 of the process of FIG. 2.

In this example, connection of the user devices 2, 4, 6 to the Internet 12 via the primary access point (i.e. via the access point 8 and the residential gateway 10) has been interrupted due to a break in the third communications link 18 (represented by an "X" in FIG. 3). In other examples, connection of the user devices 2, 4, 6 to the Internet 12 via the primary access point may not be possible for a different reason, e.g. because the access point 8 has failed or the communications link 16 is broken.

In this example, the first user device 2 is acting as a Mobile Hotspot (i.e. providing a mobile access point to the Internet 12) for each of the other user devices 4, 6. Thus, in this example, the first user device 2 has been determined to be the best device.

In this example, the first user device 2 (i.e. the best device) is connected to the Internet via a fourth communications link 20. The fourth communications link 20 may be a wireless communications link, e.g. a 3G or 4G data connection. Also, the second and third user devices 4, 6 are each connected to the Internet 12 using the secondary access point provided by the first user device 2 (i.e. using the first user device 2 as a Mobile Hotspot). In other words, the second and third user devices 4, 6 are each connected to the Internet 12 via the first communication link 14, the first user device 2, and the fourth communications link 20.

Returning now to the process of FIG. 2, at step s18 the best device determines whether or not connectivity to the Internet 12 via the primary access point (i.e. via the access point 8 and the residential gateway 10) is possible. This step (i.e. step s18) may be performed in the same way as step s8 as described earlier above. For example, the best device may periodically ping the WAN IP address of the residential gateway 10 to determine if the communications link 18 is operational or not. Alternatively, the best device may use the UPnP protocol to check the status of the WAN link of the residential gateway 10, assuming the WAN is broken and interrupt connectivity to the Internet 12.

In other words, at step s18, the best device determines whether or not Internet connectivity via the primary access point has been re-established.

The best device may periodically determine whether or not connectivity to the Internet 12 via the primary access point is possible.

If, at step s18, it is determined that that connectivity to the Internet 12 via the primary access point is not possible, the process of FIG. 2 proceeds to step s20.

If at step s18 it is determined that that connectivity to the Internet 12 via the primary access point is possible, the process of FIG. 2 proceeds to step s22. Step s22 will be described in more detail later below after a description of step s20.

At step s20, it has been determined that connectivity to the Internet 12 via the primary access point is not possible and Internet connectivity continues to be provided to the user devices 2, 4, 6 via the secondary access point. In other words, the best device continues to act as a Mobile Hotspot for the other user devices 2, 4, 6. In other words, the best device may continue to connect to the Internet 12 in some way other than via the primary access point, whilst the other user devices continue to use the best as a mobile access point to the Internet 12.

After step s20, the process of FIG. 2 returns to step s18. Thus, the best device may continuously monitor Internet connectivity via the primary access point to determine when Internet connectivity via the primary access point is re-established.

At step s22, it has been determined that connectivity to the Internet 12 via the primary access point is possible (i.e. Internet 12 connectivity via the primary access point has been re-established) and the best device multicasts (e.g. via the first communication link 14) a "fall back de-activated" message that is received by each of the other user devices 2, 4, 6. The "fall back de-activated" message may indicate that connectivity to the Internet 12 via the primary access point is possible and/or that connectivity to the Internet 12 via the secondary access point should be discontinued. In other words, the "fall back de-activated" message may indicate that an Internet connection using the best device as a Mobile Hotspot should no longer be sought, and that connection to the Internet via the primary access point may be re-established.

At step s24, the best device de-activates its Mobile Hotspot capability. This may, for example, be performed after the best device has multicast the fall back de-activated message. By de-activating its Mobile Hotspot capability, the best device may no longer function as a mobile access point (for each of the other user devices 2, 4, 6) to the Internet 12. In other words, the "secondary access point" to the Internet 12 is no longer available.

At step s26, each of the user devices 2, 4, 6 other than the best device receives, from the best device, the fallback de-activated message multicast by the best device at step s22.

At step s28, each of the user devices 2, 4, 6 may connect (e.g. reconnect) to the Internet 12 via the primary access point (i.e. via the access point 8 and the residential gateway 10).

Thus, a method in which the Mobile Hotspot functionality of a user device may be triggered is provided.

The above described methods and systems may advantageously be used to monitor Internet connectivity via a primary access point.

Furthermore, if it is detected that Internet connectivity via this primary access point is no longer possible, connection to the Internet via a different secondary access point may be automatically made available (i.e. by automatically triggering the Mobile Hotspot functionality of a device).

Furthermore, not only is the Mobile Hotspot functionality of a device automatically triggered if Internet connectivity via the primary access point is no longer available, but the device of which the mobile functionality is triggered is the device that is considered to be the "best" device (of all possible Mobile Hotspot providers) for providing this Mobile hotspot service. Thus, the device that e.g. provides the most reliable connection, has the longest battery life, etc. may advantageously be selected to provide a secondary access point to the Internet.

The above described methods and systems advantageously tend to provide that user devices may still connect to the Internet, even if connection to the Internet via the preferred route is not possible.

In the above embodiments, each of the user devices may be capable of acting as a Mobile Hotspot. Thus, it may be possible that, if connection to the Internet via the primary access point is no longer possible, each of the devices may connect to the internet independently from one another (e.g. via a respective 3G or 4G wireless communications link). However, having each device connect independently to the internet may incur a greater total cost to the user or users of the user devices because several separate Internet connections would be used as opposed to only one. Thus, the above described methods and systems may advantageously reduce the cost to a user of connecting to the Internet.

Furthermore, having each device connect to the Internet via a separate and different Internet connections would tend to use the battery power of the devices faster than if, as in the above described methods and systems, only one such Internet connection is maintained. Thus, the above described methods and systems may advantageously save battery power of one or more of the user devices.

In the above embodiments, each of the user devices may connect to the access point (e.g. using a Wi-Fi connection). In this case, even if the connection to the internet is interrupted or broken (e.g. because the residential gateway fails or because the WAN link to the Internet is interrupted), the user devices may still "see" a strong signal (e.g. Wi-Fi signal) from the access point. If a user device sees such a strong signal from the access point, it may not decide to use an alternative way of connecting to the internet (e.g. via a 3G or 4G wireless communications link) even if connection to the internet via the access point (i.e. via the Wi-Fi link) is no longer possible. The above described methods and systems advantageously tend to solve this problem.

In the above embodiments, the method of FIG. 2 comprises the best device determining whether or not Internet connectivity via the primary access point is possible. However, in other embodiments, it may be determined whether or not Internet connectivity via the primary access point is possible in a different way. For example, one or more different user devices may determine whether or not Internet connectivity via the primary access point is possible instead of or in addition to the best device.

In the above embodiments, upon detection that Internet connectivity via the primary access point is not possible, the best device distributes a fallback activated message to each of the other devices. This message may indicate to the other devices that Internet connectivity via the primary access point is not possible and that Internet connectivity via the best device may be acquired. However, in other embodiments, this information (i.e. that Internet connectivity via the primary access point is not possible and that Internet connectivity via the best device may be acquired) may be ascertained by one or more of the devices in a different way.

For example, one or more of the other devices may multicast the fallback activated message as opposed to the best device. Alternatively, the fallback activated message may be sent from one device to another in a sequence. Alternatively, no fallback activated message may be sent. In this case, each device may monitor Internet connectivity via the primary access point, and once it is detected that Internet connectivity via the primary access point is no longer possible, the current best device may automatically enable its Mobile Hotspot functionality, and each of the other device may automatically re-connect to the Internet using the current best device as a mobile access point to the Internet.

In the above embodiments, upon detection that Internet connectivity via the primary access point is re-established, the best device distributes a fallback de-activated message to each of the other devices. This message may indicate to the other devices that Internet connectivity via the primary access point is possible and that the other devices may reconnect to the Internet using the primary access point. However, in other embodiments, this information (i.e. that Internet connectivity via the primary access point has been re-established) may be ascertained by one or more of the devices in a different way.

For example, one or more of the other devices may multicast the fallback de-activated message as opposed to the best device. Alternatively, the fallback de-activated message may be sent from one device to another in a sequence. Alternatively, no fallback de-activated message may be sent. In this case, each device may monitor Internet connectivity via the primary access point, and once it is detected that Internet connectivity via the primary access point has been re-established, the best device may automatically disable its Mobile Hotspot functionality, and each of the other device may automatically re-connect to the Internet using the primary access point. Alternatively, a device (e.g. the best device) may monitor Internet connectivity via the primary access point, and once it is detected that Internet connectivity via the primary access point has been re-established, the best device may automatically disable its Mobile Hotspot functionality. Each of the other devices may detect that connection to the internet via the secondary access point is not longer available and then may automatically re-connect to the Internet using the primary access point.

I claim:

1. A method for providing Internet connection, via an access point, to at least one user device in a network of a plurality of user devices, the method comprising:
   receiving an indication, at a second user device in the network, that a first user device in the network is connected to the Internet via a first access point;
   subsequent to receiving the indication, detecting, by the second user device, that a connection between the first user device and the Internet via the first access point is not available;
   responsive to detecting that the connection between the first user device and the Internet via the first access point is not available, causing, by the second user device, a third user device in the network that is not an active access point connecting other user devices to the Internet to:
      connect to the Internet independent of the first access point; and
      activate itself as a second access point to the Internet; and
   responsive to the third user device activating itself as the second access point, connecting, by the second user device, to the Internet via:
      a connection between the second user device and the third user device;
      the third user device; and
      the connection between the third user device and the Internet.

2. A method according to claim 1, wherein the first user device, the second user device, and the third user device are the same user device.

3. A method according to claim 1, wherein:
   the third user device is both a wireless or mobile access point and a router for devices connected to it; and
   the second access point is the wireless or mobile access point provided by the third user device.

4. A method according to claim 1, wherein:
   the network is a residential Local Area Network; and
   the connection to the Internet via the first access point is a connection to the Internet via a Residential Gateway.

5. A method according to claim 1, the method further comprising notifying, by the second user device, a fourth user device in the network that a connection between the fourth user device and the Internet via the first access point is not available and that a connection to the Internet via the second access point is available, wherein the third user device and the fourth user device are different user devices.

6. A method according to claim 5, the method further comprising connecting the fourth user device to the Internet via the second access point.

7. A method according to claim 5, the notifying comprising:
   sending, from the second user device to the fourth user device, a message, the message indicating that a connection to the Internet via the first access point is not available and that a connection to the Internet via the second access point is available.

8. A method according to claim 1, the method further comprising connecting to the second access point, by each user device of the plurality of user devices, that, when a connection between the user device and the Internet via the first access point is no longer available.

9. A method according to claim 8, wherein each user device of the plurality of user devices determines that the step of determining, by each user device from the network, that, if a connection between the user device and the Internet via the first access point is not available by:
   ascertaining a capability level for each user device in the network, the capability level for a user device being indicative of that user device's ability to provide a further access point for connection to the Internet; and
   using the capability levels, determining, by each user device, which user device is to provide the further access point for connection to the Internet.

10. A method according to claim 9, wherein the ascertaining a capability level for each user device in the network comprises sending, from each user device in the network to each of the other user devices in the network, a message indicating the capability level of that user device.

11. A method according to claim 9, wherein the capability level for a user device is dependent upon one or more of a battery level of the user device, available processing power of the user device, a preference specified by a user of the user device, a signal strength of a signal received by the user device, or a cost value.

12. A method according to claim 1, the method further comprising:
   after the second access point to the Internet has been activated, notifying the third user device that a connection to the Internet via the first access point is re-available; and
   de-activating the third user device as the second access point to the Internet.

13. A method according to claim 12, the method further comprising:
   notifying a fourth user device in the network that a connection to the Internet via the first access point is re-available; and
   causing the fourth user device to connect to the Internet via the first access point, wherein the third user device and the fourth user device are different user devices.

14. A method according to claim 13, wherein the step of notifying comprises:
   sending, from the second user device to the fourth user device, a message indicating that a connection to the Internet via the first access point is re-available; and
   receiving, by the fourth user device, the message.

15. A method according to claim 1, wherein each user device is a user device selected from the group of user devices consisting of: a wireless communications device, a smartphone, a wireless phone, a desktop personal user device, a laptop user device, a tablet user device, a mobile station, an entertainment appliance, a netbook, a game console.

16. A method of connecting a user device to the Internet, the method comprising:
   connecting, by a first user device in a network, to the Internet via a first access point, an access point being a device via which a user device may connect to the Internet;
   thereafter, notifying a second user device in the network, that a connection between the first user device and the Internet via the first access point is not available;
   ascertaining, by the first user device in the network, that the first user device may connect to the Internet via a second access point, the second access point being provided by a third user device in the network;
   causing, by the first user device, the second user device to connect to the Internet via the second access point, the second access point being activated by the third user device in response to
   the first user device notifying the second user device that a connection between
   the first user device and the Internet via the first access point is not available, the
   second user device and the third user device being different user devices;
   ascertaining, by the first user device, after the second access point has been activated that the first access point is re-available;
   notifying, by the first user device, the second user device that the first access point is re-available;
   causing, by the first user device, the second user device to disconnect from the second access point and connect to the Internet via the first access point; and
   causing, by the first user device, the third user device to deactivate the second access point.

17. A method according to claim 16, wherein the first user device and the third user device are the same user device.

18. A system for providing an access point for connection to the Internet, an access point being a device via which a user device may connect to the Internet, the access point being for connection to the Internet by one or more user devices in a network comprising a plurality of user devices, the system comprising:
   a first user device in the network, the first user device being configured to connect to the Internet via a first access point;
   a second user device in the network, the second user device being operatively coupled to the first user device and configured to detect that a connection between the first user device and the Internet via the first access point is not available;
   a third user device in the network that is not an active access point connecting other user devices to the Internet, the third user device being operatively coupled to the second user device and, responsive to the second user device detecting that a connection between the first user device and the Internet via the first access point is not available, the third user device configured to:
      activate itself as a second access point to the Internet;
      connect to the Internet, the connection between the third user device and the Internet being independent of the first access point; and
      broadcast, to the plurality of user devices in the network in response to activating itself as the second access point to the Internet, a message indicating a capability level for the second access point, the second access point configured such that each other user device in the network may connect to the Internet via:
         a connection between that other user device and the third user device;
         the third user device; and
         the connection between the third user device and the Internet.

19. A mobile communications device configured to:
   connect to the Internet via a first access point;
   ascertain when the connection between the mobile communications device and the Internet via the first access point is not available;
   in response to ascertaining that the connection between the mobile communications device and the Internet via the first access point is not available, activate the mobile communications device as a second access point to the Internet and inform other devices that connection to the Internet is provided by the second access point;
   cause a different device to connect to the Internet via the second access point;
   ascertain, after activating the mobile communications device as the second access point, that the first access point is re-available;
   notify the different device that the first access point is re-available;
   cause the different device to disconnect from the second access point and connect to the Internet via the first access point;
   connect to the Internet via the first access point; and
   deactivate the mobile communications device as the second access point.

20. A system for connecting a user device to the Internet, the system comprising:
   a first user device in a network comprising a plurality of user devices, the first user device being configured to connect to the Internet via a first access point, an access point being a device via which a user device may connect to the Internet;
   a second user device in the network, the second user device being operatively coupled to the first user device and configured to detect when a connection between the first user device and the Internet via the first access point is not available;
   a third user device in the network, the third user device being operatively coupled to the second user device and configured to:
      using the detection that a connection between the first user device and the Internet via the first access point is not available, ascertain that a connection between the third user device and the Internet via the first access point is not available and that the third user device may connect to the Internet via a second access point; and
      connect to the Internet via the second access point, the second access point being:
         provided by a fourth user device in the network that is not an active access point connecting other user devices to the Internet; and
         activated by the fourth user device in response to the second user device detecting that a connection between the first user device and the Internet via the first access point is not available, the third user device and the fourth user device being different user devices.

* * * * *